United States Patent [19]

Scribano et al.

[11] Patent Number: 5,586,119
[45] Date of Patent: Dec. 17, 1996

[54] METHOD AND APPARATUS FOR PACKET ALIGNMENT IN A COMMUNICATION SYSTEM

[75] Inventors: Gino A. Scribano, Elk Grove Village; Lee M. Proctor, Cary; Quoc V. Nguyen, Lake Zurich, all of Ill.

[73] Assignee: Motorola, Inc., Schaumburg, Ill.

[21] Appl. No.: 298,916

[22] Filed: Aug. 31, 1994

[51] Int. Cl.⁶ .................................................. H04J 3/24
[52] U.S. Cl. .................. 370/350; 370/473; 455/32.1; 455/51.2
[58] Field of Search .................. 370/94.2, 95.1, 370/100.1, 60, 61, 85.6, 94.1, 18, 83, 7, 109, 111; 455/54.1, 56.1, 51.2, 32.1, 72

[56] References Cited

U.S. PATENT DOCUMENTS

| | | | |
|---|---|---|---|
| 4,420,833 | 12/1983 | Noirel | 370/83 |
| 5,117,424 | 5/1992 | Cohen et al. | 455/54.1 |
| 5,184,347 | 2/1993 | Farwell et al. | 370/94.1 |
| 5,237,568 | 8/1993 | Woest et al. | 370/94.1 |
| 5,268,933 | 12/1993 | Averbuch | 370/94.1 |
| 5,293,380 | 3/1994 | Kondo | 370/95.3 |
| 5,377,192 | 12/1994 | Goodings et al. | 455/32.1 |
| 5,416,797 | 5/1995 | Gilhousen et al. | 370/18 |
| 5,452,464 | 9/1995 | Nomura et al. | 370/94.1 |

FOREIGN PATENT DOCUMENTS

0522774A2  6/1992  European Pat. Off. ......... H04Q 7/04

*Primary Examiner*—Benedict V. Safourek
*Assistant Examiner*—Shick Hom
*Attorney, Agent, or Firm*—Jeffrey G. Toler; Kevin A. Buford

[57] ABSTRACT

A method and apparatus for packet alignment in a simulcast system includes a communications controller (310) having a vocoder and an input/output (I/O) processor (313) controlling the vocoder (311), the I/O processor having a timing alignment control (315) and a packet counter (314) for inserting timing alignment tags in voice/data packets and adjusting packet numbering and timing based on alignment requests from a master radio communication unit. The communications controller is coupled to radio communication units (330, 340, 350), each having a packet buffer (331) and an alignment processor (332) which includes a packet number detector (333) for detecting the transmission timing tag and sending a request for a packet numbering adjustment to the communications controller and a timing alignment detector (334) for comparing a receive time of the first information packet and a predetermined preferential receive time and for sending a timing alignment request to the communications controller.

26 Claims, 6 Drawing Sheets

METHOD AND APPARATUS FOR PACKET ALIGNMENT IN A COMMUNICATION SYSTEM

FIELD OF THE INVENTION

The present invention relates generally to communications systems and more particularly to for transmission in a simulcast-capable system.

BACKGROUND OF THE INVENTION

Communication systems in which information is transmitted from multiple sites are referred to as simulcast systems. In most simulcast systems it is desirable to maintain some level of synchronization of the transmitting units by the central controller. It is also desirable to transmit the information from the multiple sites as early as possible, in order to reduce delays affecting received signal quality. This reduction in quality arises both from user perceived degradation as well as degradations arising from delayed reflected energy from impedance mismatched four-to-two wire connections at target end terminals (e.g., wireline phones).

One such simulcast system in which transmission synchronization is critical is a cellular CDMA (Code Division Multiple Access) communication system incorporating soft-handoff. During soft-handoff, a subscriber receives voice or data transmissions from two or more base stations, or two or more sector transmitters, having overlapping coverage areas. Depending on the quality of the transmissions by the base stations, the subscriber may use all transmissions or choose the transmission of the base station having the best quality. However, where there is too much delay between the transmissions the subscriber is unable to perform the necessary diversity comparison of the transmissions for combination or to determine which has the best quality. This is made more critical since the communication (e.g., speech) is conveyed to the multiple sites in frames that must be assigned to fixed time windows of 20 msec for transmission. The use of such fixed time windows and synchronized timing allows the flames to be synchronously transmitted. However, a slight delay in the same frame arriving at one base station relative to another might cause the transmission at the one base station to be delayed one full time window relative to the transmission at the other base station(s).

This synchronization process is made inherently more difficult since base stations are almost always located such that transmission times from the central controller (e.g., a base site controller (BSC), mobile switching center (MSC) or the like) will differ. For accurate synchronization the difference in distance of the links or trunks connecting the base stations to the central controller should be taken into consideration. Typically this is accomplished by computing the delay from the central controller to all base stations and adjusting the transmission from the central controller based on the maximum possible delay, in other words the delay in transmission to the furthest served base station (likely including a significant "safety" margin). This results, however, in the information always being delayed by a maximal amount. Also, as the system expands and delays increase, further margins will have to be added to the built-in delay.

Another solution to these problems is disclosed in U.S. Pat. No. 5,268,933. There a finer degree of packet alignment resolution is achieved by delaying or advancing both packets based on a detection that either packet is greater than a predetermined size($\Delta_L$), or is delayed beyond a predetermined time duration of a frame (e.g., 10 msec). While this broadly discloses a time alignment technique, it only specifically discloses a process using frame buffer monitoring, or time-stamped pointers, at the base stations; further, the vocoder responds to orders from both base stations. It does not specifically teach any method for minimizing timing adjustments, whereby PCM (pulse code modulated) discontinuities into a vocoder or like may be minimized, or insuring transmission of a packet in the right time window or air frame at the base station.

Accordingly, there exists a need for a system for transmission alignment in a simulcast system which provides a finer alignment resolution and insures simulcast transmission at each base station without requiring a timing source at the BSC or requiring undesirable adjustment levels at the central controller.

DETAILED DESCRIPTION OF AN EMBODIMENT

Figure 1:
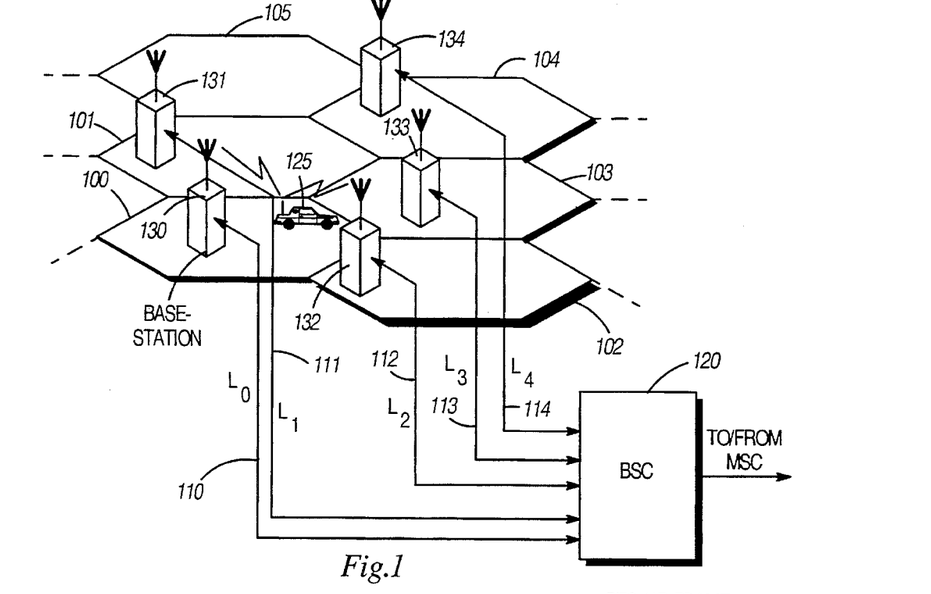
FIG. 1 generally depicts a communication system which may beneficially employ packet alignment in accordance with the invention.

These problems and others are met with a method and apparatus for packet alignment according to the present invention. FIG. 1 shows a communication system in accordance with a preferred embodiment of the invention. In this particular embodiment the communication system is a cellular radiotelephone system having radio communication base stations, or BTSs (base transceiving stations) 130–134 of cells 100–104, each coupled to base site controller (BSC, or like central communications controller) 120. The BSC 120 is in turn coupled to an MSC (mobile switching center) which acts as an interface between the local public switched telephone network (PSTN) and BTSs 130–134. While this embodiment illustrates the preferred implementation of a cellular CDMA communications system, it should be understood that the invention also has application to any other type of wireless access communication system capable of using simulcast communications. Similarly, in the embodiment discussed below the information packets to be aligned contain voice data, but the alignment technique also applies to other forms of data, including user information and control data. It should thus be understood that the following description of this presently preferred embodiment is intended for illustration and not a limitation on the scope of the invention.

As a subscriber, or a mobile radiotelephone, 125 moves throughout the cellular system, handoff of communication between the subscriber 125 and its serving BTS, which is illustrated in FIG. 1 as BTS 130, is required. In this embodiment the subscriber 125 has diversity capabilities which allow it to receive transmissions from multiple BTSs at the same time. Thus, as subscriber 125 moves towards cell 102, it enters into soft-handoff between BTSs 130 and 132.

However, this soft-handoff process can only be successful if both BTSs transmit the same information at the same time. But, while the same information packets are sent from BSC 120 to each of the BTSs 130, 132 at the same time, the packets arrive at different times because the length L0 of the ink, or span line (e.g., wire or fiber optic cable), 110 connecting BSC 120 and BTS 130 is longer than the length L1 connecting BTS 132 to BSC 120. There are, in fact, different lengths L1–L5 for each link 110–114. In a typical CDMA cellular system, an information packet is 20 msec in duration, and the difference in arrival time at different BTSs may be as great as 5 msec or more, depending on the difference between lengths of the links involved, additional network entities causing delays (repeaters and the like), etc. As discussed above, this can lead to the same information packet being transmitted in different air-frames by the different BTSs 130, 132. Also, too frequent readjustment of the PCM (pulse code modulated) sample point degrades speech quality in proportion of the magnitude and frequency of such adjustments; these adjustments may be achieved by controlling the point at which the BSC speech encoder begins sampling the PCM stream. If adjustments are received from each BTS and acted on by the BSC, in order to output speech data at the optimum time for use at each BTS, the resulting PCM discontinuities can be audible and effectively degrade speech quality.

Figure 2:
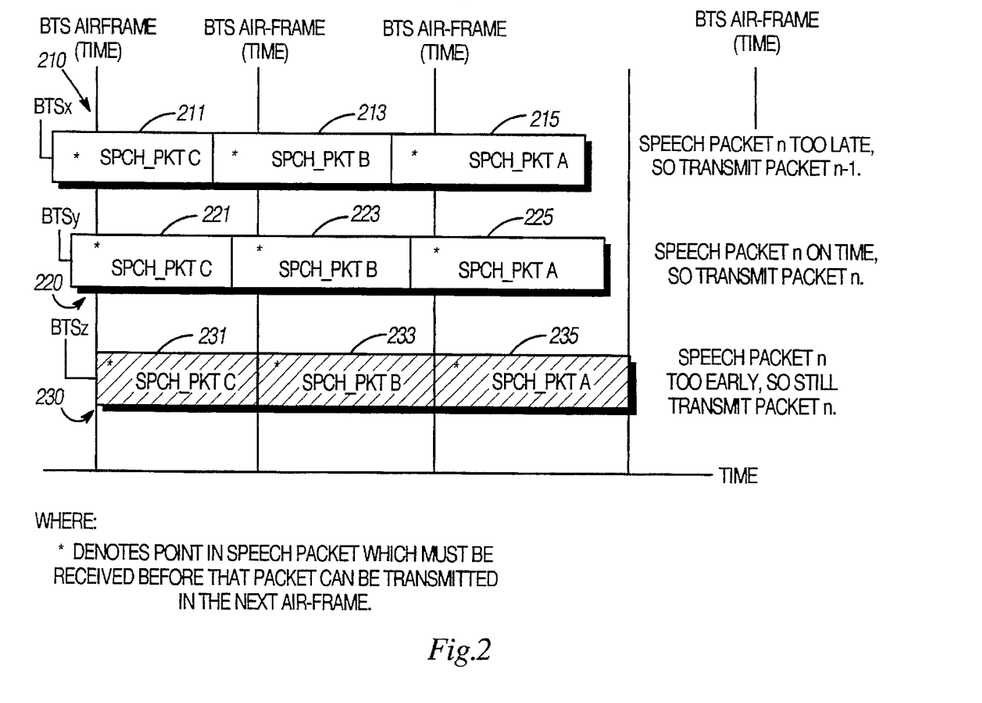
FIG. 2 illustrates information packets that are sent to a base station transceiving unit without packet alignment in accordance with the invention.

FIG. 2 illustrates how the same information packet can come to be transmitted in different air frames. The same information packets A (215, 225, 235), B (213, 223, 233) and C (211,221,231) are sent to different BTSs x–z, respectively, in datastreams 210, 220 and 230, respectively. An asterisk (*) in each packet denotes the point (bit) of each packet which must be received in a BTS before that packet can be transmitted in the next air-frame. In the illustrated case BTSx receives speech packet B just after the deadline for transmitting speech packet B in the second air frame. BTSx would then, in a typical system not identifying the packets, transmit speech packet C, the last full packet received in time for transmission. BTSy, on the other hand, receives speech packet B just in time for transmission in the second air frame. BTSy would then transmit packet B. BTSz receives speech packet B just before the cut-off for transmitting packet B. BTSz would then transmit packet B. The end result is that BTSx, which is transmitting different data than BTSy and BTSz, would be an interferer and negate the benefits of soft-handoff.

Figure 3:
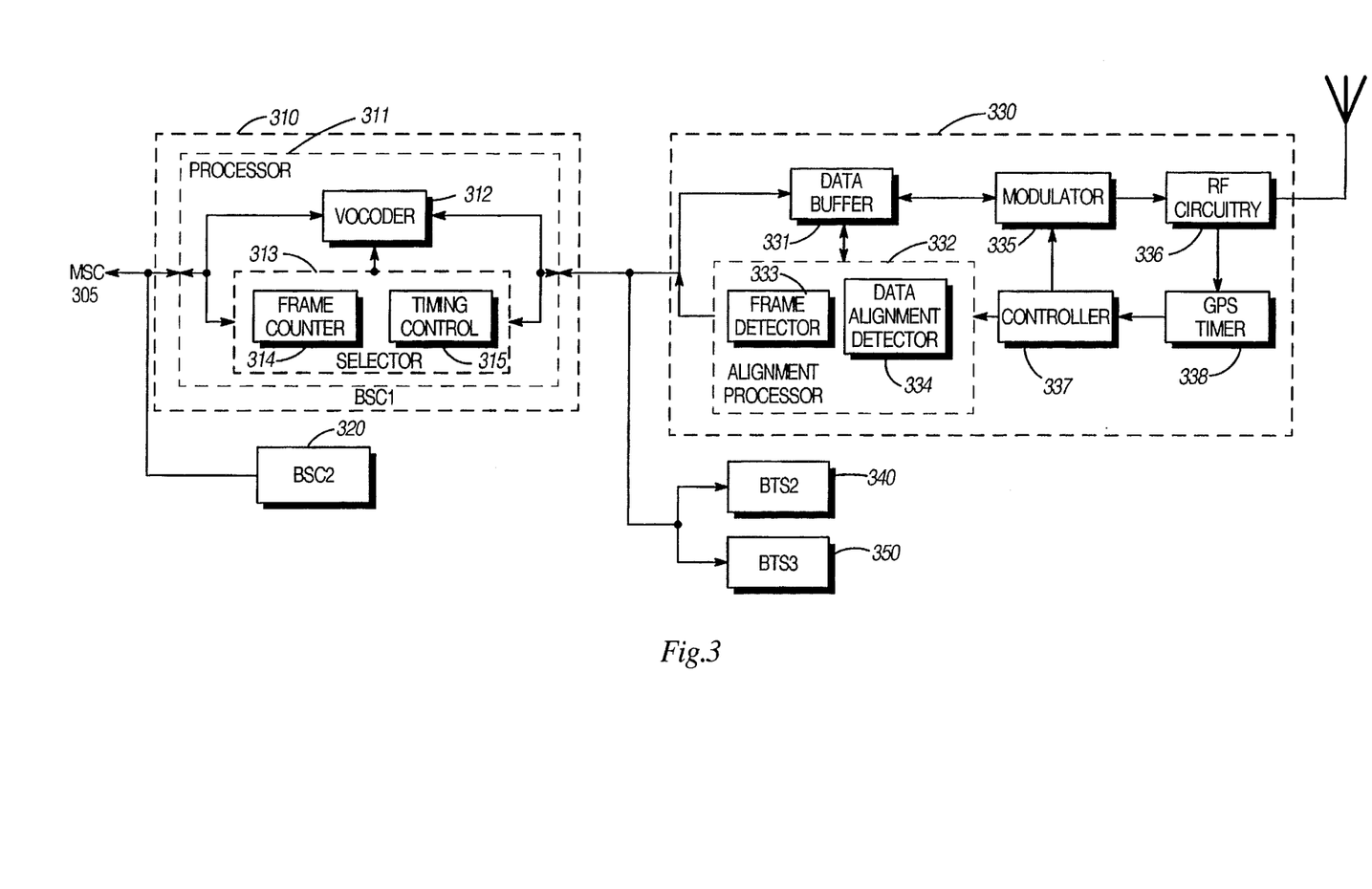
FIG. 3 is a block diagram generally illustrating a base site controller and base transceiving station (BTS) in the communication system of claim 1 according to an embodiment of the invention.
Figure 5:
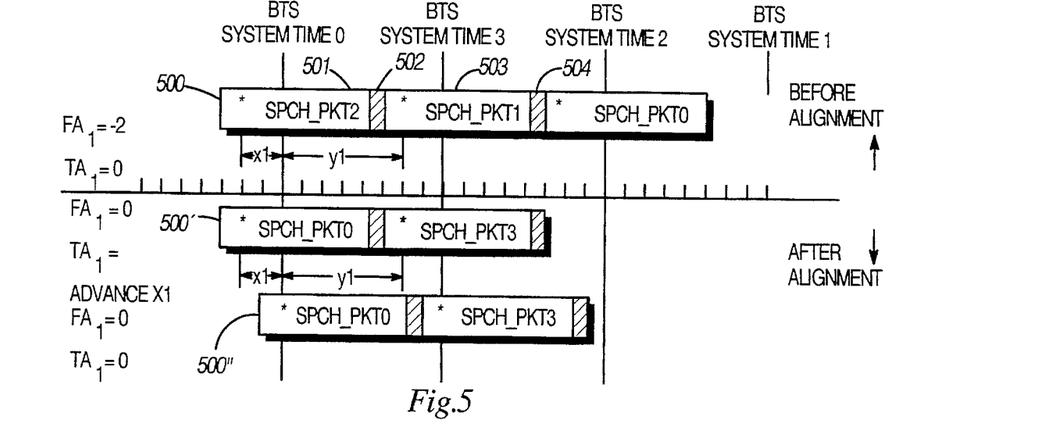
FIGS. 5–10 illustrate the alignment of various information packets, as BTSs are added or dropped, in accordance with the invention.

These and other problems are avoided by using frame and time alignment according to the present invention. Turning to FIG. 3, a CDMA communication system implementing the invention is generally shown. A skilled artisan will readily appreciate how to interconnect the various subsystems, as well as what additional subsystems are typically used in implementing such a communication system. MSC 305 is coupled to each of its BSCs 310, 320. BSC1 (310) is in turn coupled to BTS1–BTS3 (330, 340 and 350). BSC1 (310) includes a processor 311, which is preferably a digital signal processor (DSP). Processor 311 includes a vocoder/rate adaptation unit 312, for appropriately coding outbound speech/data information and adding frame numbers, as well as a selector 313 for controlling the alignment of data packets being sent to the BTSs. Selector 313 is preferably an I/O (input/output) processor, including a frame/packet counter (and numbering) 314 and timing alignment control 315 functionality. Selector 313 is appropriately configured to control vocoder 312 to insert packet/frame number information (i.e., timing transmission tags), and receive timing adjustment requests and control vocoder 312 to advance/retard the packets/frames. FIG. 5, in datastream 500, shows how such frame number information (502, 504) can be added, for example as a preamble to each packet (501,503). For ease of implementation the air-frames are demarcated as system times 0–3; in a typical CDMA system this time will be derived at each BTS from a GPS (global positioning system) time signal. The use of the decoded UTC (universal time code) of the GPS signal is particularly advantageous to use for a system time in the present invention, in that the appropriate bits (00, 01, 10, 11) representing multiples of the 20 msec air-frame period can be used at the BTSs to establish system times 0–3, respectively, synchronously at all BTSs. One skilled in the art will appreciate that additional frame numbers can be readily accommodated by considering 3 or more bits of the UTC. For purposes of timing alignment, BTS1 (330) of FIG. 3 uses the UTC to set a strobe indicating the start of an air-frame period. As a packet is received in packet buffer 331, data/timing alignment detector 334 detects how far the receive timing differs from the point by which the packet would have been received just-in-time for transmission (denoted by the asterisk in each packet).

In operation processor 311 of BSC1 (310) will receive timing alignment requests from each BTS in a soft-handoff active set. The range of these requests may be from −20 msec to +20 msec. Based on these requests the selector determines which BTS in the active set is encountering the longest transmission delay, in other words which BTS is requesting the largest timing advance or smallest retard if no advance requests are made. The selector 313 will use this BTS as the alignment master (or master radio communication BTS). As such, processor 311 will only respond to time alignment requests from the designated time alignment master BTS. Other BTSs in the soft-handoff active set sending time alignment requests will be ignored by the processor 311.

This results in the time alignment master receiving data packets just-in-time for transmission. All other BTSs receive their data packets before they are required for transmission, and these packets are therefore buffered. However, there is no added delay incurred by the non-master BTSs since all the BTSs are synchronized, and would be required to buffer packets anyway to transmit the same data at the same time. With timing adjusted in this fashion, the PCM sample encode point is optimized for all BTSs in the soft-handoff active set. The PCM sample encode point need only be readjusted if a new soft-handoff candidate BTS enters the active set which is "farther" than all other BTSs, or if the master is deleted from the active set.

Preferably BSC1 310 begins at start-up by setting an air-frame counter to a predetermined number, for example 0 (bits 00). As with timing alignment, each BTS can request frame alignment. This is accomplished by detecting the "tagged" information packet (i.e., its packet or frame number) in buffer 331 via frame/packet number detector 333 of alignment processor 332, and then comparing the packet frame number with the actual air-frame number (system time) at the BTS (determined by the controller 337 from GPS timer 338 information). A frame (or packet) alignment request is then sent to processor 311 of BSC1 (310) indicating the amount by which the tagged frame number is off. For example, if the system time is determined to be 3 (i.e., bits 11), a request for a frame advancement of +1 is sent. Processor 311 adjusts the frame number based on a request from the master, but ignores the remaining requests. It is important to note that a frame alignment adjustment does not actually change the timing of the data at the BSC in any way, only the frame number. The immediate purpose of frame alignment is thus to set the air frame number counter such that the air frame number matches the system time at each BTS, and the master BTS in particular. This in turn allows the BTSs to temporally validate each data packet prior to air transmission, something that prior art methods did not permit.

A skilled artisan will appreciate that the actual timing transmission adjustments may be done in a variety of ways. For example, the advance/retard adjustment could be done abruptly, skipping or repeating some information. This is advantageous at times like start-up, but has the potential to degrade perceived quality. Alternatively, adjustment of the sampling point can take place over a number of frames/packets, but at the cost of further delay in establishing handoff. One skilled in the art will be able to implement an appropriate timing adjustment taking into consideration these factors and others affecting the particular system being designed.

Figure 4:
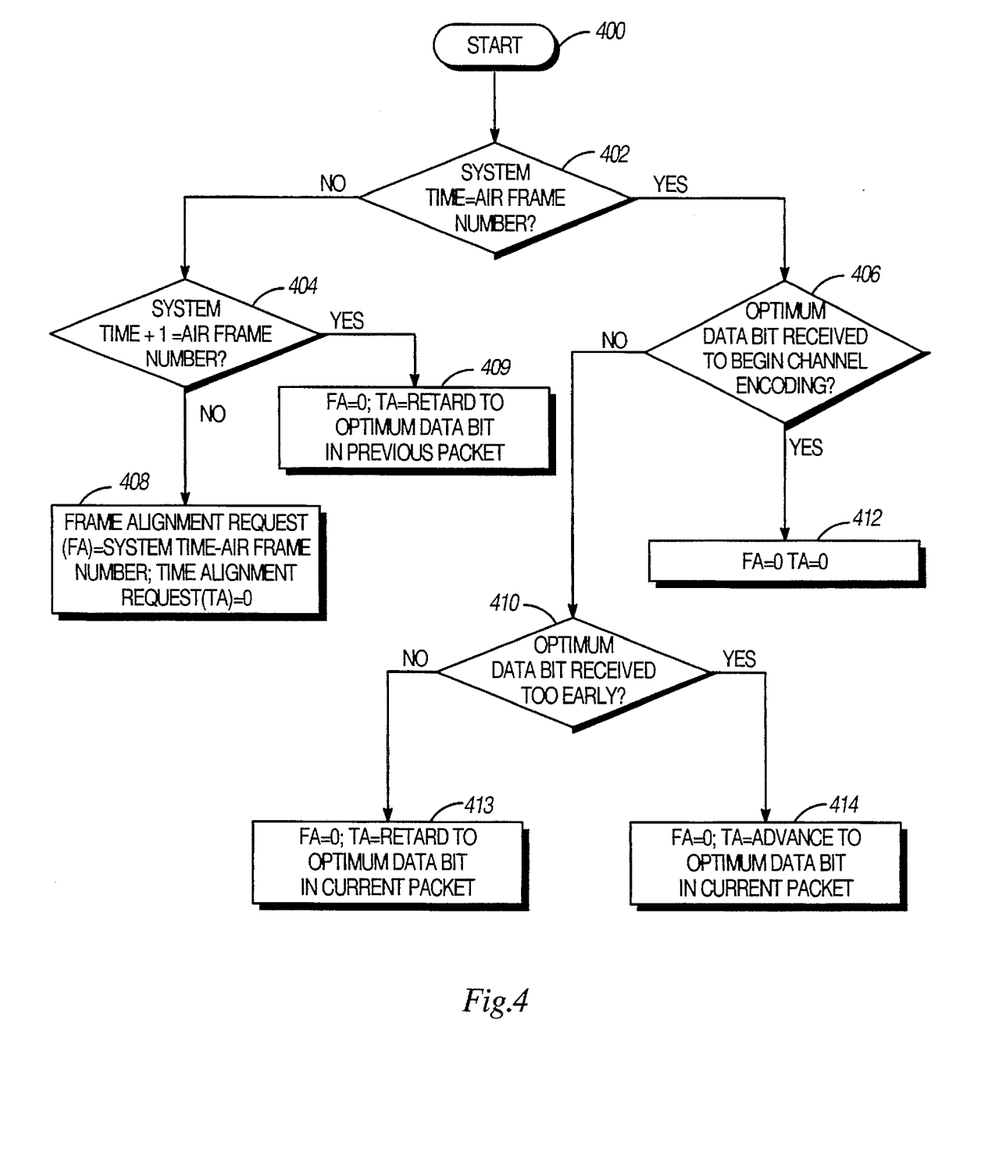
FIG. 4 is a flow chart illustrating the steps for determining the alignment required by the BTS of FIG. 3.

FIG. 4 is a flow chart illustrating steps used by processor 332 of BTS1 (330) for determining an alignment request to BSC1 (310). Depending on the outcome of a comparison of the packet frame number with the system time (steps 400–404), a frame alignment request of either 0 (steps 409, 412–414) or the difference between the system time number and packet air frame number (step 408) is sent. Depending on the arrival time of the packet, as for example determined using the optimum data bit (illustrated by the asterisk), a timing advance requests is generated asking for appropriate adjustment (steps 412–414).

Figure 6:
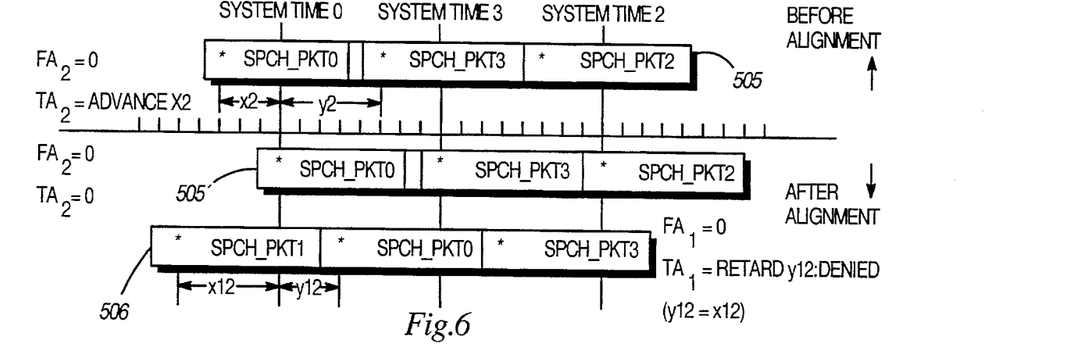
Figure 7:
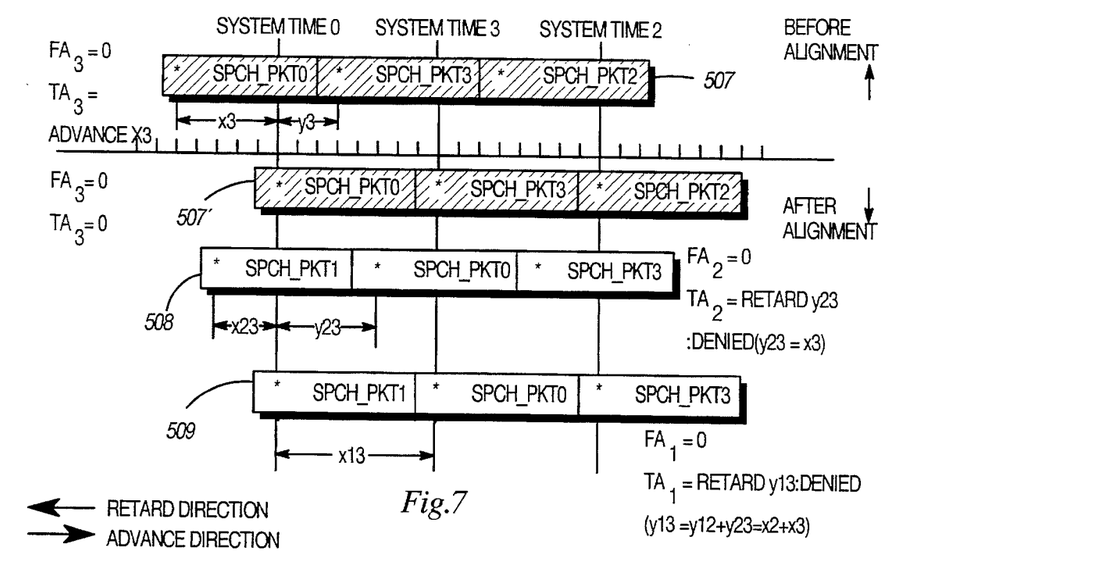

Reference should now be made to FIGS. 5–10, which further illustrate alignment of various information packets in accordance with the invention. FIGS. 5–7 illustrate what occurs when new master BTSs are added to a simulcast active set. Beginning with FIG. 5, the case of a one cell alignment, such as found in a start-up situation, is shown. A datastream 500 including packets 501 and 503, with frame numbers in preambles 502 and 504, respectively, is received at BTS1 within the noted system time periods (the illustrated system time indicates the point at which synchronous transmission by each BTS begins). Because the packet being received at system time 0 has an air frame number of 2, a frame alignment request (FA) of–2 is made by BTS1. The adjusted datastream 500', including packets 501' and 503' and preambles 502' and 504', is still off in timing, so a timing advance request (TA) of x 1 is also made. For simplicity of illustration, in this and the following drawings the notation xnm is used to denote an advance of x time required by BTSn due to BTSm (the master), and ynm denotes a timing retard required by BTSn due to BTSm. Since BTS1 is the only serving BTS in FIG. 5, both FA and TA requests are accepted by the BSC. The resulting datastream 500" is just-in-time adjusted for transmission in the appropriate air frames.

FIG. 6 illustrates the addition of a second BTS2, which has a longer transmission delay for its received datastream 505 than BTS1. Since BTS1 is frame aligned, BTS2 is also considered to be frame aligned on the assumption that the maximum differential span line transmission delay is less than 20 msec. A time alignment request (TA2) of advance x 2is made by BTS2 and accepted by the processor 311. BTS2 is then optimally frame and time aligned (data stream 505'). BTS1 then receives data earlier than needed (datastream 506, which is datastream 500" advanced by x2), and requests a retard of y12. However, since BTS1 is no longer the master, the request is not acted on by the BSC.

FIG. 7 illustrates the addition of BTS3, which has a longer transmission delay than BTS2 or BTS1. A time alignment request (TA3) of advance x 3 is made by BTS3 for datastream 507 and accepted by the BSC. BTS3 is then optimally frame and time aligned (datastream 507'). BTS2 and BTS1 are now receiving data (508, 509) earlier than needed and therefore request retards of y23 and y13, respectively. Both retards are denied by the BSC, since BTS3 is now the master.

Figure 8:
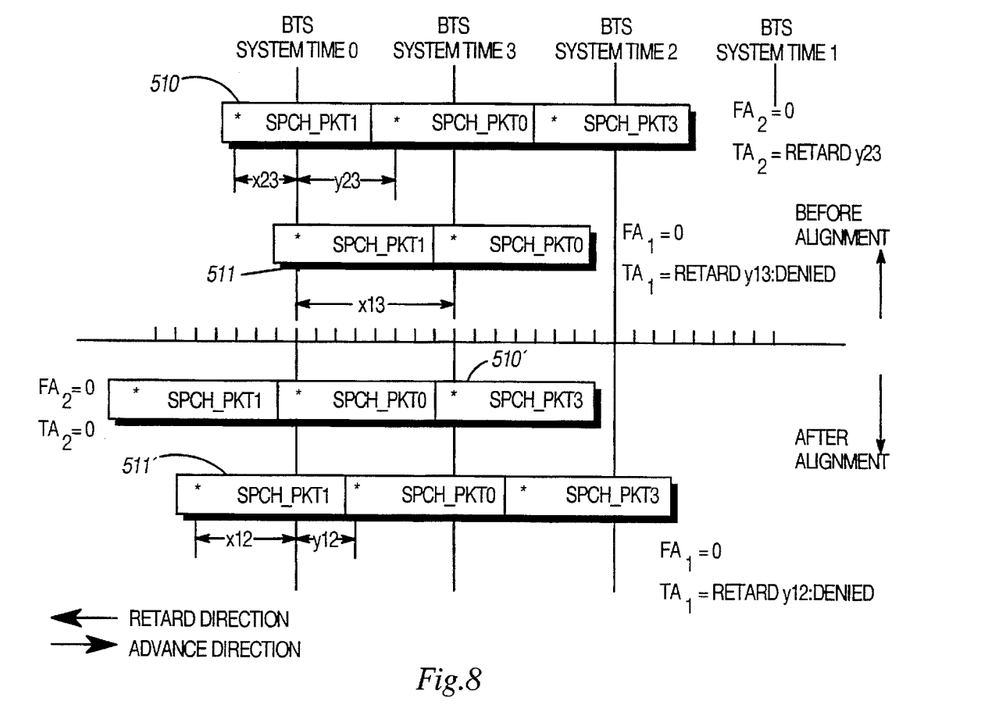

FIG. 8 illustrates how alignment is affected when the master BTS, BTS3, is deleted from the active set. BTS2 generates the smallest timing retard request (TA2 for datastream 510), so BTS2 is designated the new master. A retard request of y13 for datastream 511 is rejected. Datastream 510' of BTS2 is then optimally aligned, and datastream 511' of BTS1 is received early and buffered.

Figure 9:
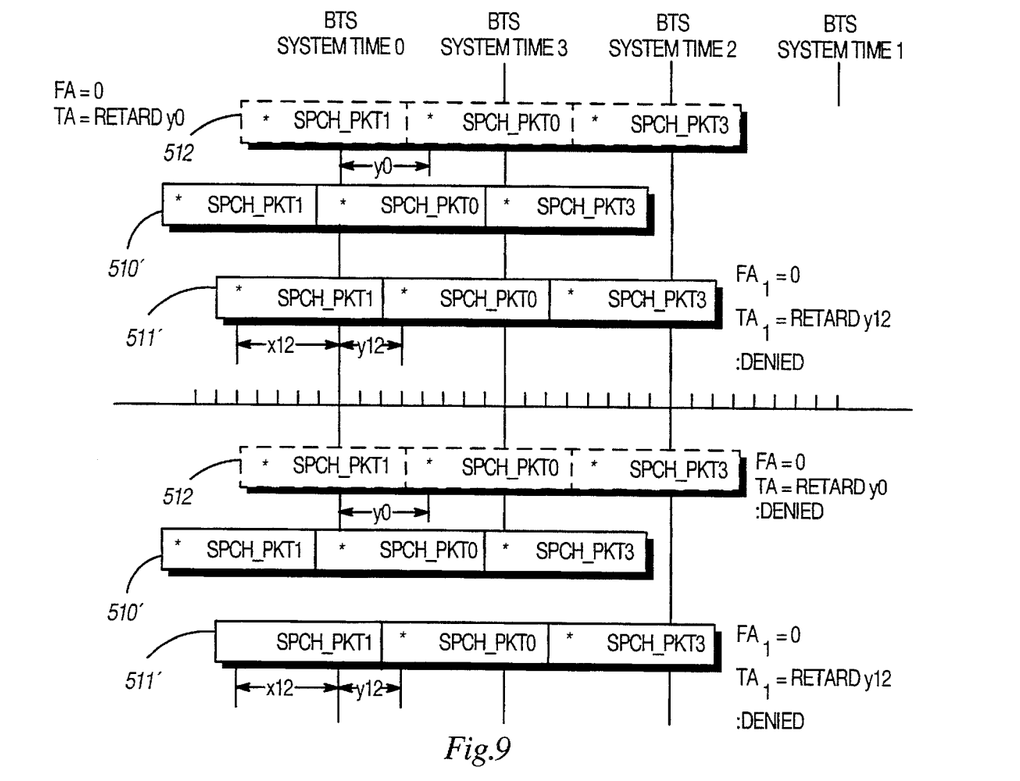
Figure 10:
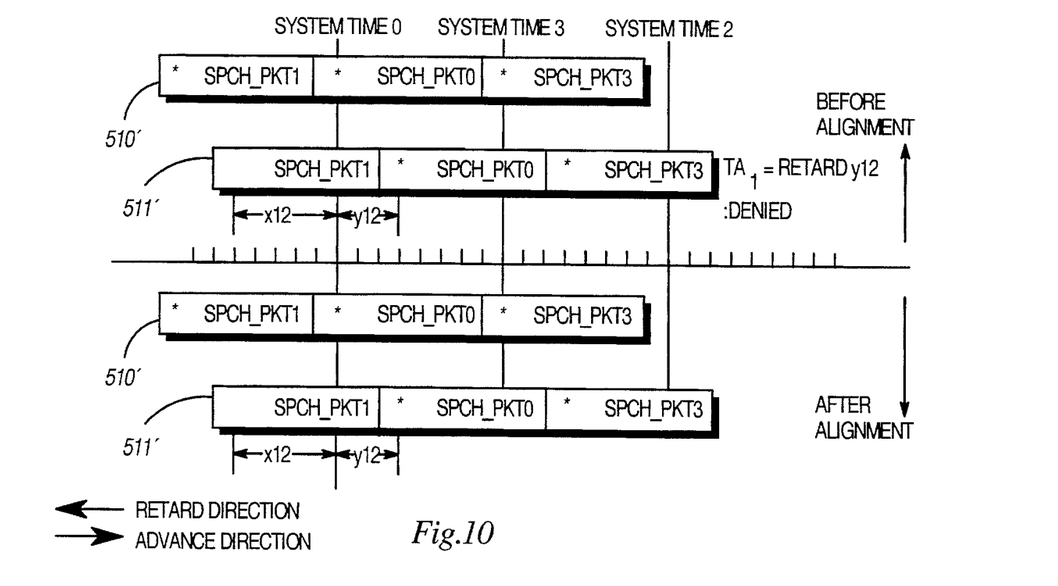

Finally, FIGS. 9 and 10 illustrate how alignment is affected by a change in status of a non-master BTS. FIG. 9 illustrates the addition of a BTS0 (receiving datastream 512) having a shorter span line delay than BTS1 (receiving datastream 511'). BTS2 remains the master. The time alignment request TA0 of BTS0 is accordingly denied. BTS2 remains optimally aligned, and BTS0 and BTS1 continue to receive data earlier than needed. In FIG. 10 BTS0 is deleted from the active set. In this case BTS2 still remains the master, and the retard request y12 of BTS1 continues to be denied.

There has thus been shown a simulcast system permitting verification that a packet is due for transmission at the transmitting circuitry (BTS), and permitting improved time alignment. While the invention has been described with reference to an illustrative embodiment thereof, it will be apparent to one skilled in the art that various modifications and changes can be made without departing from the spirit and the scope of the invention. For example, a skilled artisan will appreciate that although the digital receiver circuitry has been logically separated in the detailed description above, the actual implementation of these functions may be accomplished in a variety of different manners including, but not limited to, properly programming a digital signal processor (DSP), coupling discrete components together, and using a combination of one or more application specific integrated circuits (ASICs). Nor is the invention limited to CDMA or cellular systems, as it may have application to any simulcast-capable system, including but not limited to PCS (personal communication services) systems having plural radio ports (RPs) controlled by a radio port controller unit (RPCU), and trunked radio and satellite systems. Rather, the spirit and scope of the invention should be understood in view of the claims below.

We claim:

1. A method for aligning information packets for transmission by a communications controller to at least first and second radio communication units for radio transmission in a connection-oriented communication system, the method comprising the steps of:

(a) receiving a first information packet and inserting a timing transmission tag therein to produce a tagged first information packet;

(b) synchronously sending said tagged first information packet to the first and second radio communication units; and (c) synchronously performing radio frequency transmission of data associated with said tagged first information packet via the first and second radio communication units.

2. The method of claim 1 further comprising:

(d) determining if the tagged first information packet is received at the first and second radio communication units.

3. The method of claim 2 wherein step (c) further comprises receiving a frame alignment request from each of the first and second radio communication units indicative of a comparison of the transmission timing tag in the tagged first information packet and a first system time, and determining if a further transmission timing tag for a further information packet should be incremented in response to one of the frame alignment requests.

4. The method of claim 2 wherein step (d) further comprises receiving a timing alignment request for each of the first and second radio communication units indicative of the difference between a received time of the tagged first information packet and a predetermined preferential receive time, and determining if transmission by the communications controller of the further information packet should be advanced or retarded in response to one of the timing alignment requests.

5. The method of claim 4 wherein step (c) further comprises determining which of the first and second radio communication units has a greatest transmission delay by determining which timing alignment request is requesting one of a greatest timing advance and, in the absence of any request for an advance, a least timing retard, and assigning the determined one of the first and second radio communication units as a master unit for use in determining if the further transmission timing tag for the further information packet should be incremented and if transmission of the further information packet should be advanced or retarded.

6. A method of requesting alignment of a further information packet based on a first information packet, in a radio communication unit for use with a connection-oriented communication system, the method comprising the steps of (a) receiving the first information packet, the first information packet including an inserted transmission timing tag;

(b) comparing said inserted transmission timing tag with a timing signal to determine if the first information packet has been received at a predetermined time, and sending a request for transmission adjustment for the further information packet; and (c) comparing the transmission timing tag with a system time to determine if the transmission timing tag corresponds to the system time, and sending a frame alignment request to a communications controller to increment a frame counter depending on the comparison between the transmission timing tag and the system time.

7. The method of claim 6, wherein data associated with said first information packet is synchronously transmitted over a radio frequency by further radio communication units with the radio communication unit.

8. The method of claim 7, wherein the transmission timing tag comprises an air frame number, and the frame alignment request is responsive to the difference between the system time and the air frame number.

9. The method of claim 7, further comprising comparing a receive time of the first information packet and a predetermined preferential receive time for the first information packet, and sending a timing alignment request to the communications controller indicative of the difference between the receive time of the first information packet and the predetermined preferential receive time.

10. The method of claim 9, wherein the predetermined preferential receive time is determined based on an optimum data bit of the first information packet being received at the system time, such that the first information packet can be transmitted by the communication unit in a frame corresponding to the system time.

11. The method of claim 10, wherein the timing alignment request is a request to advance the further information packet by the difference between the receive time of the optimum data bit and the predetermined preferential receive time when the optimum data bit is received too early to transmit the first information packet in the frame corresponding to the system time.

12. A communications controller in a connection-oriented communication system capable of simulcast transmissions via plural communication units, comprising:

a processor aligning information packets for transmission to at least a first of the plural communication units, said processor comprising a coder formatting a first information packet for transmission to the first communication unit and a selector controlling the coder to insert a timing transmission tag in the first information packet to form a tagged first information packet.

13. The communications controller of claim 12 wherein the processor is further operable for sending the tagged first information packet to the first and a second of the plural communication units at the same time.

14. The communications controller of claim 12 wherein the selector comprises packet numbering means for determining if the tagged first information packet is received at the first and second communication units such that the first information packet can be transmitted by both first and second communication units at a predetermined time.

15. The communications controller of claim 14, wherein the packet numbering means is further operable for receiving a frame alignment request from each of the first and second communication units indicative of a comparison of the transmission timing tag in the tagged first information packet and a first system time, and for determining if a further transmission timing tag for a further information packet should be incremented in response to one of the frame alignment requests.

16. The communications controller of claim 15 wherein the selector further comprises a timing control device receiving a timing alignment request for each of the first and second communication units indicative of the difference between the received time of the tagged first information packet and a predetermined preferential receive time, and for determining if transmission by the control communication unit of the further information packet should be advanced or retarded in response to one of the timing alignment requests.

17. The communications controller of claim 16 wherein the timing control device is further operable for determining which of the first and second communication units has a greatest transmission delay by determining which timing alignment request is requesting one of a greatest advance and, in the absence of any request for an advance, a least retard, and assigning the determined one of the first and second communication units as a master unit for use in determining if the further transmission timing tag for the further information packet should be incremented and if transmission of the further information packet should be advanced or retarded.

18. A communication unit in a telecommunication system capable of simulcast transmissions via plural communication units, comprising:

(a) a receiver unit receiving a first information packet, the first information packet including an inserted transmission timing tag; and (b) means for detecting and comparing said inserted transmission timing tag with a timing signal to determine if the first information packet has been received at a predetermined time, and for sending a request for transmission adjustment for a further information packet; and (c) a transmitter responsive to the receiver unit, the transmitter sending data associated with the first information packet over a radio frequency interface.

19. The communication unit of claim 18 wherein the means for detecting and comparing comprises a packet detector comparing the transmission timing tag with a system time, used synchronously by further communication units with the communication unit, to determine if the transmission timing tag corresponds to the system time, and for generating and sending a frame alignment request to a communications controller to increment a packet numbering selector depending on the comparison between the transmission timing tag and the system time.

20. The communication unit of claim 19, wherein the means for detecting and comparing further comprises a data alignment detector comparing a receive time of the first information packet and a predetermined preferential receive time for the first information packet, and generating and sending a timing alignment request to the communications controller indicative of the difference between the receive time of the first information packet and the predetermined preferential receive time.

21. The communication unit of claim 20, wherein the data alignment detector is further operable for generating the predetermined preferential receive time based on a predetermined time for receiving an optimum data bit of the first information packet at the system time, such that the first information packet can be transmitted by the communication unit in a frame corresponding to the system time.

22. A communications controller in a telecommunication system capable of transmissions via plural communication units, comprising:

a vocoder; and a selector coupled to the vocoder, the selector comprising a packet counter and a timing alignment control device;

said vocoder, in response to said selector, inserting a timing transmission tag into a packet to be transmitted.

23. A communication unit in a communication system having plural communication units capable of simulcast transmissions, comprising:

a packet buffer receiving a first information packet from a communications controller, the first information packet including an inserted transmission timing tag; and an alignment processor coupled to the packet buffer and in communication with the communications controller, the alignment processor comprising:

a packet detector operable for detecting said inserted transmission timing tag and sending a request for a packet numbering adjustment to the communications controller, and a timing alignment detector operable for comparing a receive time of the first information packet and a predetermined preferential receive time for the first information packet and for sending a timing alignment request to the communications controller indicative of the difference between the receive time of the first information packet and the predetermined preferential receive time.

24. A communication system capable of simulcast transmissions comprising:

a communications controller comprising a vocoder and an input/output processor coupled to the vocoder and operable for controlling the vocoder to insert a transmission timing tag in an information packet and adjust transmission timing of the information packet, the input/output processor comprising a packet counter and numbering device and a timing alignment control operable for controlling the vocoder in response to alignment requests; and plural radio communication units, including a master radio communication unit, each coupled to the communications controller and comprising:

a packet buffer, coupled to the communications controller and operable for receiving the information packet from the communications controller; and an alignment processor coupled to the packet buffer and the communications controller, the alignment processor comprising:

a packet number detector operable for detecting the transmission timing tag and sending a packet alignment request to the communications controller, and a timing alignment detector operable for detecting a receive time of the first information packet and sending a timing alignment request to the communications controller;

wherein the packet counter and numbering device and timing alignment control are only responsive to the packet alignment request and timing alignment request sent by the master radio communication unit.

25. A method for aligning information packets for transmission by a communications controller to at least a first and second radio communication units for radio transmission, comprising the steps of:

(a) receiving a first information packet and inserting a timing transmission tag therein to produce a tagged first information packet;

(b) synchronously sending said tagged first information packet to the first and second radio communication units;

(c) receiving a timing alignment request for each of the first and second radio communication units indicative of the difference between a received time of the tagged first information packet and a predetermined preferential receive time; and (d) determining if transmission by the communications controller of the further information packet should be advanced or retarded in response to one of the timing alignment requests.

26. A communications controller in a communication system comprising:

a processor aligning information packets for transmission to at least a first of the plural communication units, said processor comprising a coder formatting a first information packet for transmission to the first communication unit and a selector controlling the coder to insert a timing transmission tag in the first information packet to form a tagged first information packet;

said selector further comprising a timing control device receiving a timing alignment request for the at least first of the plural communication units indicative of the difference between the received time of the tagged first information packet and a predetermined preferential receive time, and for determining if transmission by the control communication unit of the further information packet should be advanced or retarded in response to one of the timing alignment requests.

* * * * *